US010338960B2

(12) United States Patent
Maier et al.

(10) Patent No.: US 10,338,960 B2
(45) Date of Patent: Jul. 2, 2019

(54) PROCESSING DATA SETS IN A BIG DATA REPOSITORY BY EXECUTING AGENTS TO UPDATE ANNOTATIONS OF THE DATA SETS

(71) Applicant: International Business Machines Corporation, Armonk, NY (US)

(72) Inventors: Albert Maier, Tuebingen (DE); Yannick Saillet, Stuttgart (DE); Harald C. Smith, Groveland, MA (US); Daniel C. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/115,640

(22) PCT Filed: Feb. 18, 2015

(86) PCT No.: PCT/IB2015/051233
§ 371 (c)(1),
(2) Date: Jul. 29, 2016

(87) PCT Pub. No.: WO2015/136395
PCT Pub. Date: Sep. 17, 2015

(65) Prior Publication Data
US 2017/0139746 A1 May 18, 2017

(30) Foreign Application Priority Data

Mar. 14, 2014 (GB) .................................. 1404523.1

(51) Int. Cl.
*G06F 9/46* (2006.01)
*G06F 9/48* (2006.01)
*G06F 17/30* (2006.01)

(52) U.S. Cl.
CPC ...... *G06F 9/4881* (2013.01); *G06F 17/30613* (2013.01); *G06F 17/30997* (2013.01)

(58) Field of Classification Search
None
See application file for complete search history.

(56) References Cited

U.S. PATENT DOCUMENTS 6,339,775 B1   1/2002   Zamanian et al.
6,381,556 B1   4/2002   Kazemi et al.
(Continued)

FOREIGN PATENT DOCUMENTS

CN   1992640        7/2007
CN   101477568      7/2009
(Continued)

OTHER PUBLICATIONS

Examination Report, dated Feb. 2, 2017, for Ref. No. DE920130136GB2, Application No. GB1616819.7, Total 5 pages.
(Continued)

*Primary Examiner* — Wissam Rashid
(74) *Attorney, Agent, or Firm* — Janaki K. Davda; Konrad, Raynes, Davda and Victor LLP

(57) ABSTRACT

The invention provides for a method for processing a plurality of data sets (105; 106; 108; 110-113; DB1; DB2) in a data repository (104) for storing at least unstructured data, the method comprising: —providing (302) a set of agents (150-168), each agent being operable to trigger the processing of one or more of the data sets, the execution of each of said agents being automatically triggered in case one or more conditions assigned to said agent are met, at least one of the conditions relating to the existence, structure, content and/or annotations of the data set whose processing can be triggered by said agent; —executing (304) a first one of the agents; —updating (306) the annotations (115) of the first
(Continued)

data set by the first agent; and —executing (308) a second one of the agents, said execution being triggered by the updated annotations of the first data set meeting the conditions of the second agent, thereby triggering a further up-dating of the annotations of the first data set.

33 Claims, 3 Drawing Sheets

(56) References Cited

U.S. PATENT DOCUMENTS

| | | | |
|---|---|---|---|
| 6,542,896 | B1 | 4/2003 | Gruenwald |
| 6,643,635 | B2 | 11/2003 | Nwabueze |
| 7,299,244 | B2 | 11/2007 | Hertling et al. |
| 7,620,661 | B2 | 11/2009 | Mehaffy et al. |
| 7,912,820 | B2 | 3/2011 | Garden et al. |
| 8,666,998 | B2 | 3/2014 | Nelke et al. |
| 9,077,727 | B2 | 7/2015 | Marchisio et al. |
| 9,213,741 | B2 * | 12/2015 | Burger .............. G06F 17/30463 |
| 9,330,141 | B2 * | 5/2016 | Salch ................ G06F 17/30463 |
| 9,411,853 | B1 * | 8/2016 | Dovrtel ............. G06F 17/30592 |
| 2002/0128998 | A1 | 9/2002 | Kil et al. |
| 2004/0111430 | A1 | 6/2004 | Hertling et al. |
| 2004/0249856 | A1 | 12/2004 | Garden et al. |
| 2008/0263029 | A1 | 10/2008 | Guha et al. |
| 2011/0276633 | A1 | 11/2011 | Marchisio et al. |
| 2012/0066214 | A1 | 3/2012 | Nelke et al. |
| 2012/0317155 | A1 | 12/2012 | Ogasawara et al. |
| 2013/0086039 | A1 | 4/2013 | Salch et al. |
| 2013/0212086 | A1 | 8/2013 | Burger et al. |
| 2017/0139746 | A1 | 5/2017 | Maier et al. |

FOREIGN PATENT DOCUMENTS

| | | |
|---|---|---|
| CN | 101510206 | 8/2009 |
| CN | 102273167 | 12/2011 |
| CN | 103003813 | 3/2013 |
| CN | 103080924 | 5/2013 |
| CN | 103092952 | 5/2013 |
| CN | 103310022 | 9/2013 |
| EP | 1197879 | 4/2002 |
| JP | 2002108903 | 4/2002 |
| JP | 2004206694 | 7/2004 |
| JP | 2004362596 | 12/2004 |
| JP | 2011138317 | 7/2011 |
| WO | 2013132309 | 9/2013 |

OTHER PUBLICATIONS

Examination Report, dated Nov. 9, 2016, for Ref. No. DE920130136GB2, Application No. GB1616819.7, Total 4 pages.
Reply to Examination Report (with replacement pages for claims), dated Jan. 4, 2017, for Ref. No. DE920130136GB2, Application No. GB1616819.7, Total 9 pages.
Feng et al., "Design of the Low-Cost Business Intelligence System Based on Multi-Agent", dated 2010, 2010 International Conference of Information Science and Management Engineering, Total 4 pages.
International Search Report and Written Opinion, dated Jul. 6, 2015, for International Application No. PCT/IB2015/051233, filed on Feb. 18, 2015 Total 11 pp.
United Kingdom Search Report, dated Sep. 11, 2014, for Application No. GB1404523.1, Total 3 pages.
"Converting Raw Data to an Access Database", dated Jul. 5, 2007, (online) retrieved from the Internet on Jul. 28, 2016 at URL> http://www.techspot.com/community/topics/converting-raw-data-to-an-access-database.81210, Total 1 page.
"Managing Unstructured Data with Oracle Database" dated Feb. 2009, (online) retrieved from the Internet on Jul. 28, 2016 at URL>http://www.oracle.com/us/products/database/options/spatial/039950.pdf, An Oracle White Paper, Total 11 pages.
Information Materials for IDS, dated Aug. 31, 2018, for JPO Office Action dated Aug. 28, 2018, Total 1 page.
U.S. Pat. No. 7,299,244 is an English counterpart for JP2004206694 dated Jul. 22, 2004.
U.S. Pat. No. 7,912,820 is an English counterpart for JP2004362596 dated Dec. 24, 2004.
Publication 2004111430 is an English counterpart for JP2004206694 dated Jul. 22, 2004.
Publication 2004249856 is an English counterpart for JP2004362596 dated Dec. 24, 2004.
U.S. Patent Application, dated Aug. 14, 2018, for U.S. Appl. No. 16/103,743, invented by Albert Maier et al., Total 39 pages.
Preliminary Amendment, dated Aug. 14, 2018, for U.S. Appl. No. 16/103,743, invented by Albert Maier et al., Total 11 pages.
Machine Translation for JP2002108903, dated Apr. 12, 2002, Total 22 pages.
Chinese Search Report, dated Nov. 8, 2018, Total 3 pages.
Publication 2012/0066214 is an English counterpart for CN103080924, May 1, 2013.
U.S. Pat. No. 8,666,998 is an English counterpart for CN103080924, May 1, 2013.
Publication 2011/276633 is an English counterpart for CN102273167A, Dec. 7, 2011.
U.S. Pat. No. 9,077,727 is an English counterpart for CN102273167A, Dec. 7, 2011.

* cited by examiner

PROCESSING DATA SETS IN A BIG DATA REPOSITORY BY EXECUTING AGENTS TO UPDATE ANNOTATIONS OF THE DATA SETS

FIELD OF THE INVENTION

The present disclosure relates to the field of processing data in a Big Data repository.

BACKGROUND

Before data can be used in information management programs like data warehouses, master data management (MDM) or Big Data analysis programs, many steps are necessary for integrating raw data from a plurality of internal and external sources into a consolidated data repository in a format which can be consumed in a meaningful way by end-users. First, the data sources containing all the information necessary for a particular task need to be identified. Thus, a user needs to know the semantic content of the available data sets, e.g. by manual inspection or by manually triggering the execution of semantic data profiling tools on the available data sets. The user may start a data profiling project and incorporate sources he thinks are relevant. However, said steps already require the user to know which sources should be analyzed. Interesting data sources may be missed. In addition, the user has to spend time and effort to get used to the available data sets and tools as he or she needs to know which kind of analysis tools require which kind of data format.

Data integration may further be complicated by the fact that some data sets may comprise confidential information which should not be presented to the end-user or some groups of end-users. Ensuring and increasing the data quality of the available data sets may also be an issue: data may be stored redundantly in the original data sets, may comprise inconsistent information on some data records, or may be presented in different data formats and standards.

In the prior art, a plurality of products and approaches exist that can fulfill some of the above requirements, but said tools rely either on the manual control and configuration of the user or on a predefined and fixed workflow schema. A user or the workflow schema need to explicitly specify which one of the tools have to be applied on which one of the data sets at what moment in time in order to solve a particular problem. Manual data pre-processing and profiling approaches can only be used in situations when the amount of data to be integrated is small and is of comparatively low complexity. Predefined, workflow-based data processing approaches require a fixed sequence of data sets to be processed, whereby the syntax and content of said data sets is known in advance. Such data is often called structured data, both in connection with workflow-based data processing and otherwise.

In a Big Data environment, however, huge amounts of data need to be integrated and processed, and neither the content, nor the syntax, nor the sequence nor the file format of the data to be integrated may be known in advance. Such data not limited to data sets where the syntax and content is known in advance is often called unstructured data. It may not be possible to foresee if and when a particular data set may be available. Manual approaches cannot be applied as humans are not able to cope with the complexity and dynamicity of the data processing tasks involved. Approaches which rely on predetermined workflows are also not applicable as it is not possible to foresee the kind and sequence of all the data preprocessing, profiling and analysis steps which may be necessary for integrating and processing dynamically provided new data. Thus, neither manual nor workflow-based approaches are able to cope with the amount, structural and semantic heterogeneity, and unpredictability of the data to be handled by a Big Data environment.

US006381556 B1, for example, discloses a method for preparing raw data coming from a manufacturing environment in order to load said data for reporting purposes. The presented approach is rather static similar to an ETL job. US006643635 B2 describes a transforming of data for business analysis in an automated way for reading and preparing data from disparate data sources based on a static data processing schema.

SUMMARY OF THE INVENTION

It is an objective of embodiments of the invention to provide for an improved approach for processing data in a Big Data environment. The improvement may thereby relate to a reduction of time and effort a human user has to spend on planning, triggering and supervising the processing of data to be transferred into or already contained in a Big Data repository. The improvement may also relate to the seamless integration of legacy data processing programs, to an increased quality of analytical data processing and to an increased safety of confidential data. The ability of a Big Data repository to adequately and flexibly handle and process data whose availability, content and structure varies dynamically and cannot be foreseen in advance may also be increased.

Said objective is solved by the subject matter of the independent claims. Advantageous embodiments are described in the dependent claims.

A data repository or a 'Big Data' repository as used herein is a data container for storing and managing structured and unstructured data sets. The data sets to be integrated into a Big Data repository may be semantically and/or syntactically heterogeneous. The order, semantic content, source and/or syntactic form of the data sets to be integrated or processed may be unpredictable. It may be necessary to continuously integrate new data sets and process existing data sets. The amount of data manageable by a Big Data repository may be large, e.g. in the range of petabytes (1,024 terabytes) or exabytes (1,024 petabytes) comprising billions to trillions of records. The amount of data to be stored in a Big Data repository may not be processable by traditional database and software techniques. The data may—at least in part—be incomplete, confidential, redundant, inconsistent or syntactically unsuited for data analysis.

An 'annotation' is metadata (e.g. a comment, explanation, a set of one or more tags or mark-ups, property-value pairs, etc.) being descriptive of and being associated with other data. Annotations may be metadata gathered for a particular data set and stored in association with said data set. The metadata may consist of structural metadata (about the design and specification of data structures) and/or descriptive metadata (about the data content).

The term 'data processing' may refer to any kind of pre-processing or processing a data set. For example, the data processing may refer to any kind of semantic, statistic or syntactic data analysis, the formatting, converting, masking, correction, splitting and combining of data sets, and the like.

A 'condition' is a clause in respect to a particular entity, e.g. a data set to be processed, that may be fulfilled or not.

A 'program engine' is any kind of executable program logic, e.g. an application program, a script, a (web) service, a program module, a database routine or the like.

An 'agent' is any kind of executable program logic, e.g. an application program, a script, a (web) service, a program module, a database routine or the like, that has assigned one or more conditions and whose execution is automatically triggered upon fulfillment of said conditions. At least some of said conditions relate to a data set (including said data set's annotations) that is to be processed by said agent. An agent may process a data set directly or indirectly with the help of other programs referred herein as 'program engines'.

In one aspect, the invention relates to a computer-implemented method for processing a plurality of data sets in a Big Data repository. A set of agents is provided. Each agent is operable to trigger the processing of one or more of the data sets. Execution of each of said agents is automatically triggered in case one or more conditions assigned to said agent are met. At least one of the conditions of each of the agents relater to the existence, structure, content and/or annotations of the data set whose processing can be triggered by said agent. For example, the creation of a new data set within the Big Data repository or the import of an external data set into the Big Data repository may represent an event that triggers the execution of an agents having assigned a condition that said created or imported data set 'exists' within the Big Data repository.

The method comprises executing a first one of the agents. Said execution is triggered by the conditions of the first agent in respect to a first one of the data sets being met. The execution of the first agent triggers the processing of the first data set. Then, the annotations of the first data set are updated by the first agent. Thereby a result of the processing of the first data set is included in said annotations. The processing of the first data set yielding said result was triggered by the first agent. The 'updating' of annotations of a particular data set may comprise the modification and/or supplementing of existing annotations of said data set or the initial creation of annotations of said data set. Said new or updated annotations may comprise the results of the processing of said data set.

The method further comprises executing a second one of the agents. The execution of said second agent is triggered by the updated annotations of the first data set meeting the conditions of the second agent. The execution of the second agent triggers a further processing of the first data set. The second agent further updates the annotations of the first data set by results obtained from said further processing.

According to embodiments, each agent of the set of agents can solely be triggered by an updating of the annotations of one of the data sets to be processed by said agent and/or by a detection of a new data set in the Big Data repository. Said detection may be executed by a repository manager of the Big Data repository. The execution of said agent results in an updating of the annotations of the processed data set. The updating may include initially creating annotations for the processed data set.

According to some embodiments, the set of agents comprise a sub-set of multiple agents which can solely be triggered by an updating of the annotations of one of the data sets to be processed by said agent. The multiple agents are operable to automatically process and prepare data sets in order to output the processed data set or some results of said processing to the user. The sequence said agents are executed solely depends on the fulfillment of data-set related conditions and thus follows a completely data-driven, dynamically and automatically determined sequence of processing tasks.

According to some embodiments, the processing of the data sets is performed by the agents directly. According to further embodiments, the Big Data repository is accessible by a plurality of program engines. Each program engine is operable to process at least one of the data sets. At least some of the agents have respectively assigned one of the program engines and respectively comprise an interface to their assigned program engine. The agents trigger the processing of one or more of the data sets by initializing, via their interface, the execution of their respectively assigned program engine. Said features may allow implementing all program agents in accordance with a first program language or framework, e.g. Java, EJB, .NET or the like, while the actual processing may be done by program engines of different frameworks which may also be legacy programs.

A called program engine may return the results of the processing to the calling agent. The calling agent may use said result (directly or after some additional processing steps) and add said result or a derivative thereof to the annotations of said data set. In addition or alternatively the agent may use said results for creating a derivative data set.

According to embodiments, the method further comprises providing, for each of the program engines, a task queue. The triggering of the execution of one of the engines by one of the agents comprises adding a task for processing one or more of the data set by said one program engine to the task queue of said program engine. The adding of said task to the task queue is executed by said agent. Then, said one program engine processes one or more data sets in accordance with the order of said program engine's task queue. Thus, the task queues may allow organizing and managing processing tasks whose execution is triggered by a plurality of different agents.

According to embodiments the Big Data repository is operatively coupled to a workload manager. At least some of the agents are operable to trigger the execution of a set of equivalent program engines. 'Equivalent program engines' as used herein are program engines which are operable to generate identical processing results from a given one of the data sets. Thus, equivalent processing engines may functionally replace each other. The workload manager repetitively receives workload information from each of the program engines, e.g. upon predefined time intervals (e.g. every millisecond, second or minute). The workload information may be indicative of capacity utilization of said program engine. The capacity utilization of a particular processing engine may be specified, for example, by the number of tasks in the queue of said processing engine. In addition, or alternatively, the capacity utilization of a program engine may comprise capacity utilization information of a computer system hosting said program engine, e.g. parameters being indicative of the consumption of a resource such as CPU, storage, memory, network traffic or the like.

The workload manager repetitively and automatically determines, by using the received workload information as input, for at least one set of equivalent program engines assigned to one of the agents, the program engine with the lowest capacity consumption. Then, the workload manager provides an indication of said determined program engine to the agent to which said set of equivalent program engines is assigned. After having received said indication, said agent selectively triggers the execution of the indicated program engine rather than triggering execution of any one of the other equivalent program engines assigned to said agent.

According to embodiments, the workload information of any one of the program engines comprises the number of tasks currently stored in the task queue of said program engine.

According to embodiments, at least some of the agents have assigned a priority number. The Big Data repository is operatively coupled to an agents manager which continuously monitors the instantiation and/or execution of all the agents and obtains some monitoring information. The agents manager automatically determines, based on the information, that at least two of the agents try to process the same one of the data sets. In addition, or alternatively, the agents manager determines that at least two of the agents require a computational resource (e.g. CPU, memory or storage capacity or an unoccupied program engine) which cannot be provided to both agents concurrently. The agents manager evaluates the priority number of the at least two agents and selectively allows the agent with the highest priority number to execute. The agents manager may block all other evaluated agents permanently or at least until the execution of the agent with the highest priority number has finished. The prioritization of agents may provide for a data processing system that flexibly reacts to different situations. For example, two agents (or their respective processing engine) may require access to a particular data set. However, access to said data set may only be granted to one agent (or processing engine) at a time to prohibit the creation of inconsistent data records.

According to some embodiments, at least some of the data sets have assigned a priority number. The Big Data repository is operatively coupled to the agents manager. The agents manager continuously monitors the instantiation and/or execution of all the agents. The agents manager automatically determines, based on the monitoring information, that one of the agents was initiated for triggering the processing of two or more different ones of the data sets. Then, the agents manager evaluates the priority number of said two or more different data sets. The agents manager, based on said evaluation, causes said agent to trigger the processing of the data sets having assigned the higher priority number. The agents manager may, for example, block all other evaluated data sets having a lower priority number from being processed by said agent at least until the processing of the evaluated data set with the highest priority number has finished. Alternatively, in case multiple equivalent processing engines are available and are assigned to said agent, the agents manager may likewise cause said agent to trigger the execution of the data set with the highest priority by a first processing engine and to trigger the execution of a data set with a lower priority by a second processing engine equivalent to the first processing engine.

According to some embodiments, at least some of the processing engines may be operable to process N data sets in parallel, N being an integer larger than 'one'. In these cases, the agents manager may select the N data sets which have the highest priority numbers and may cause the parallel processing of said selected N data sets by the processing engine.

The prioritizing of the execution of different data sets may be implemented by the agents manager moving a task for processing a data set with a higher priority number to the top of the queue of the program engine which is to execute said processing. Other data sets having a lower priority will be processed by said processing engine as soon as capacity of the program engine allows it. This may allow prioritizing some data sets over others. In cases where the agents as well as the data sets may have assigned a priority number, both priority numbers are evaluated by the agents manager, e.g. based on some rules.

According to embodiments, the Big Data repository or an application program or module which is interoperable with the Big Data repository provides a graphical user interface (GUI) to a user. The Big Data repository receives, via the GUI, configuration data from a user and modifies the conditions of one or more of the agents in accordance with the received configuration data. In addition, or alternatively, the Big Data repository modifies the priority number of one or more of the agents and/or a priority number assigned to one or more of the data sets. Said modifications are executed in accordance with the received configuration data.

According to embodiments, the first agent or a program engine triggered by the first agent creates a second data set. The second data set is a derivative of the first data set. The derivative data set may be a cleansed data set from which erroneous, redundant and/or confidential data was removed, or that was brought into a suitable data format. Updating the annotations of the first data set comprises supplementing the annotations of the first data set with a link pointing to a storage location of the generated second data set. The execution of the second agent may comprise using the generated second data set as the first data set which is then further processed by the second agent or by a program engine called by the second agent. This may allow for an automated and fully transparent switching to a processed or otherwise improved data set as a basis for further processing steps, whereby 'transparent' means that a user may not even recognize that the data set he or she is working on has actually changed. For instance, the second data set can be a relational database table having been derived from a first data set consisting of a CSV file by a parsing operation. For many analytical and other program engines it is easier to work with relational database tables than with a CSV file. Other examples of derivative data sets may be masked data sets not comprising any confidential data.

According to embodiments, the plurality of program engines comprises, in any combination, at least two of the following types of program engines:

A program engine which is operable to execute a file format identification task or a file syntax identification task. Said program engine may annotate a data set with file format information or syntax information.

A program engine which is operable to execute an extract-transform-load (ETL) task for transforming a data set to fit operational needs of other program engines. The data set to be transformed may have been imported by the Big Data repository or may have been created within the Big Data repository. Typically, semantic profiling tools and/or the user require the data to be presented in a particular syntactic form such as a CSV, RDF, Binary or XML file or a relational or columnar database table. In said cases, the available data sets need to be transformed into a format that can be interpreted by the data profiling tools.

A program engine which is operable to execute a data quality check for automatically removing data records of low quality from the processed data set, e.g. erroneous, redundant, ambiguous, outdated or inconsistent data records. In addition, or alternatively, said program engine may be operable to supplement the annotations of the processed data set with an automatically determined quality level of said data set.

A program engine which is operable to execute a data masking operation for automatically removing confidential data values or confidential data records from the processed data set and/or for supplementing the annotations of the processed data set with information that any confidential data was successfully removed from said data set.

A program engine which is operable to execute master data management (MDM) operations for automatically correcting, standardizing or processing the data records in the processed data set according to technical requirements and/or business requirements. A MDM operation may comprise collecting, aggregating, matching, consolidating, quality-assuring, persisting and/or distributing data throughout an organization. Said program engine may in addition or alternatively be able to supplement the annotations of the processed data set with information on the result of said MDM operations.

A program engine which is operable to execute a data analysis of the processed data set and/or to supplement the annotations of the processed data set with the result of said data analysis. Said analysis may comprise, for example, text analytics or statistical analytics.

At least some of said program engines may also be capable of generating a notification to a user for review of the processed data set.

According to embodiments, a search index data structure is provided to a user of the Big Data repository. The search index data structure allows the user to execute a search for retrieving complete data sets matching the search criteria (e.g., retrieving data sets containing person information having assigned a minimum quality level) and/or to execute a search for data records of selected data sets on said index data structure. Annotations created by any one of the agents for any one of the data sets are continuously and automatically added to the search index data structure by the agents having triggered the data processing. The annotations may comprise additional metadata and analysis results which may not have been contained in the data sets originally loaded into the Big Data repository.

According to embodiments, one of the agents may automatically (and, preferentially, transparently to the user) replace a first pointer of said search index data structure by a second pointer. Said replacement is executed in case said generated second data set is a derivative of a first one of the data sets. The first pointer points to the first data set, the second pointer points to the second data set. Said feature may allow for a fully automated and transparent switching to a new data set when doing an index-based search. The query may be or comprise a keyword search but may also be a more complex query. For example, a query to a first data set for which an agent has derived a second, derivative data set, would transparently return the data from the second data-set instead of the first data set. A search could be, for example: "Search all data sets containing data of type person name and address and whose data quality index is higher than 80%." A data quality agent may produce annotations containing metrics (ex: 80% of the rows are valid). The search criteria can then include that kind of numerical metric. Thus, by automatically creating additional annotations (metadata) by a cascade of agents, and by automatically integrating said annotations into the search index, the quality of the search is automatically increased.

According to embodiments, at least some of the agents are hosted on different computer systems connected to each other via a network. At least some of the program engines triggered by respective agents are legacy applications hosted on the same computer system as the triggering agent.

Depending on the embodiment, the Big Data repository may be implemented based on a distributed file system such as Hadoop, a non-distributed file system, a relational or columnar database, a content management system or another equivalent system or framework.

In a further aspect, the invention relates to a computer-readable storage medium comprising machine executable instructions for execution by a processor. Execution of the instructions causes the processor to execute a method according to any one of the above embodiments.

In a further aspect, the invention relates to a computer system comprising a processor and a computer-readable storage medium. The computer-readable storage medium comprises a Big Data repository. The Big Data repository comprises a plurality of data sets and machine executable instructions for execution by the processor. Execution of the instructions causes the processor to execute a method according to any one of the above embodiments.

As will be appreciated by one skilled in the art, the features of the above mentioned embodiments can be combined with each other. Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the foam of a computer program product embodied in one or more computer readable medium(s) having computer readable program code embodied thereon.

BRIEF DESCRIPTION OF THE DRAWINGS

The above and other items, features and advantages of the invention will be better understood by reading the following more particular description of embodiments of the invention in conjunction with the figures wherein.

DETAILED DESCRIPTION OF THE INVENTION

Figure 1:
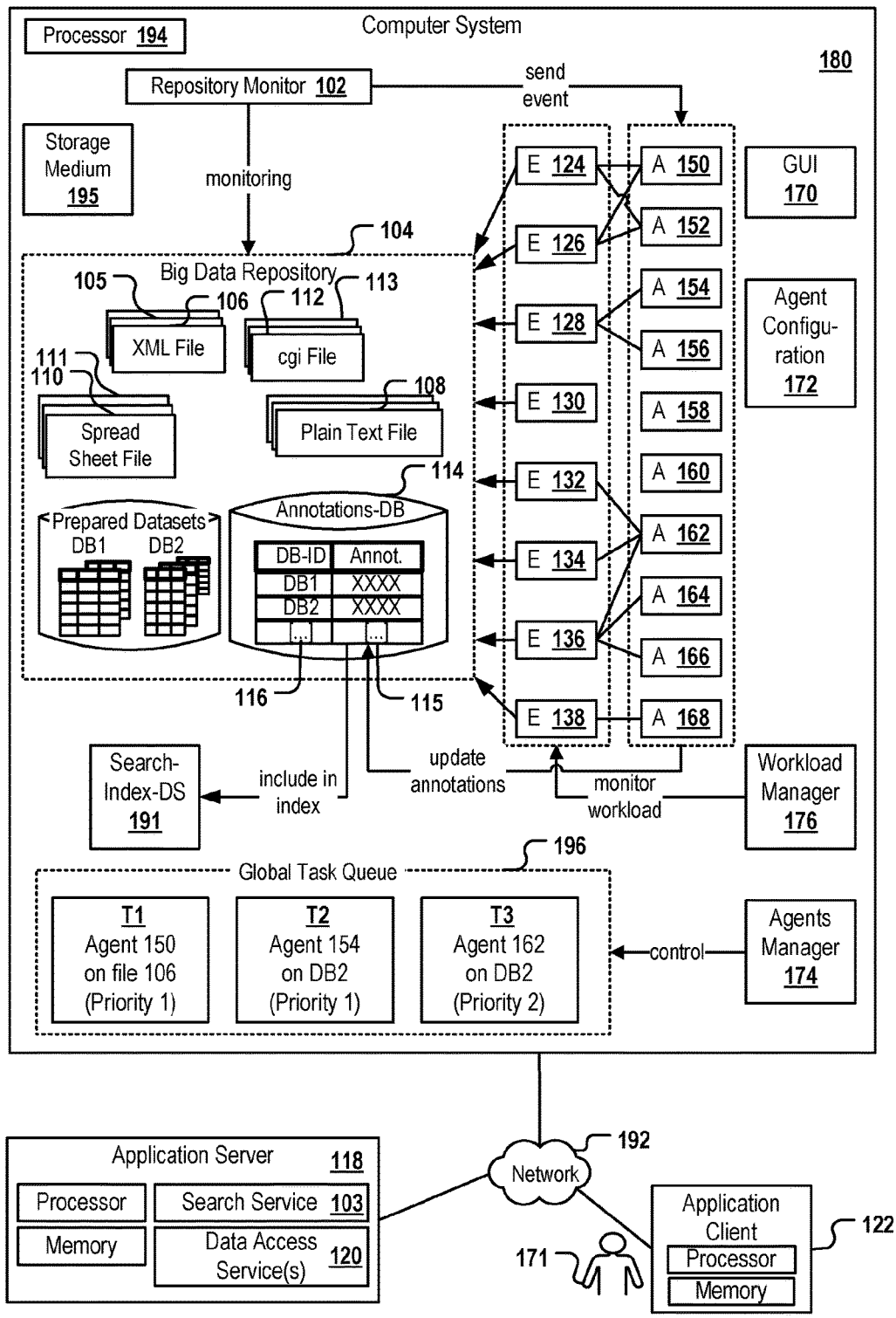
FIG. 1 is a block diagram of a computer system comprising a Big Data repository.

FIG. 1 depicts a computer system 180 comprising a processor 194 and a computer readable storage medium 195. The storage medium may be a single storage medium or consist of a plurality of connected storage media. Also, the processor may consist of a plurality of processors operatively coupled to each other. The multiple storage media and processors may be provided and managed, for example, by a cloud-environment. The computer system hosts a Big Data repository 104 which may be based on a distributed file system such as Hadoop. It may comprise a plurality of data sets 105, 106, 110-113, 108, DB1, DB2 which are created and/or processed by a plurality of different agents 150-168. The agents may call program engines 124-138 of very different types for processing the data sets and for executing tasks such as file format recognition, column analysis, ETL operations, data profiling and the like.

An agent is a component whose execution on one of the data sets is triggered by an event that all conditions associated with said agent are met. Said conditions may completely or at least partially relate to features of the data set to be processed, including the annotations of said data set. For example, a condition for starting a column analysis on a data set could be the adding of a new annotation to said data set, whereby said annotation indicates that the data set has been parsed and that a derivative data set having the form of a relational table has been created (which is a suitable format for executing a columnar data analysis). The agents may use internal program logic or call external program logic for processing a data set. Said program logic may provide processing results that are used by the agent for creating or updating annotations of the processed data set and/or for creating a derivative data set. For instance, an agent for recognizing the file format would produce annotations indicating the recognized file format. An agent for creating a derivative data set by means of a data format transformation job could create annotations pointing to the derivative data set and comprising meta-information on its format. Each agent may have assigned a priority number to indicate how urgently the data processing task should be launched once the conditions triggering a respective agent are met.

A list of registered agents and the conditions respectively triggering their activation are stored in an agent configuration database 172. An agent manager 174 is a piece of program logic which may receive events from a repository monitor 102 and may decide, based on the configuration of the agents stored in the agent configuration database 172, which agent should run on which data set (in case the conditions of multiple agents are fulfilled in respect to a particular, recently updated data set). Once the agent manager detects that the condition for activating an agent on a data set is fulfilled, it places an agent execution task in a global task queue 196. The global task queue may comprise multiple tasks T1-T3 to be executed by a respective agent 150, 154, 162 on one of the data sets 106, DB2. The position of the agent's task in this queue will depend on the priority number of the agent and/or of the priority numbers of those agents whose tasks for execution are already in the queue and/or the time of enqueuing the task. The order of the tasks in the queue may also be modified by the user at runtime, e.g. via a graphical user interface 170 allowing a user to modify the conditions and priority numbers assigned to the agents and to modify the priority numbers assigned to at least some of the data sets.

Figure 2:
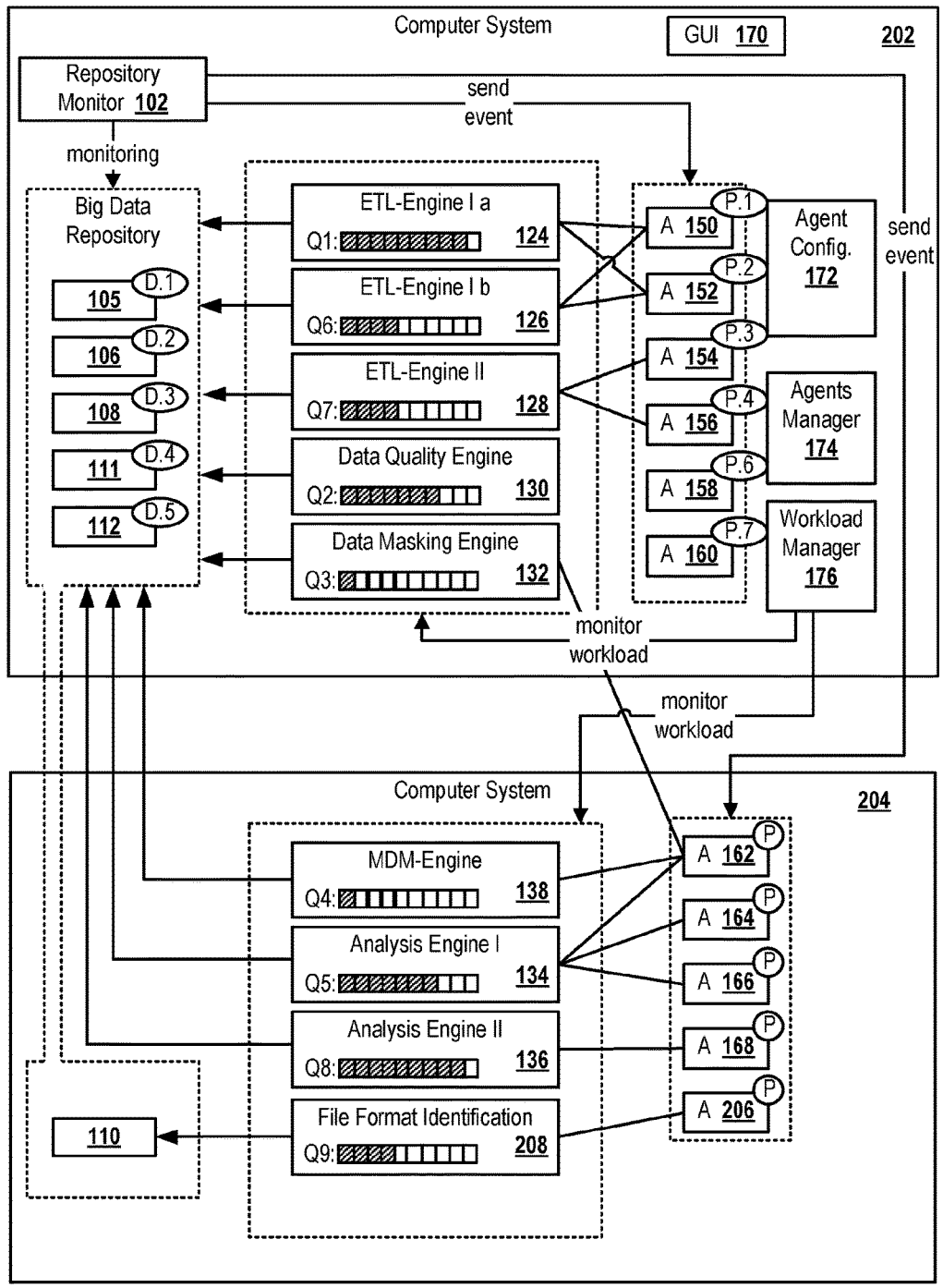
FIG. 2 depicts a distributed variant of said computer system.

A workload manager 176 monitors the global task queues as well as the queues of the program engines as depicted in FIG. 2. The workload manager will assign, if a plurality of equivalent program engines is available for executing a data processing task by one of the agents, said processing task of said agent to an equivalent processing engine whose job queue is comparatively empty and/or which is executed on a computer system having free CPU/memory/storage capacity. Upon having finished a data processing tasks, the agent or program engine having executed said task and having created or updated some annotations may automatically include the created or updated annotations in a search index data structure 191. The search index data structure allows any user 171 of an application client 122 to quickly search the content of the Big Data repository via a network 192. Said search may be a key word search or a more complex search which also evaluates meta-data contained in the annotations of the data sets (for instance: search for all data sets containing person data whose completeness and quality is >90%).

When the user 171 chooses to retrieve a particular data set, the version of the data set which is actually retrieved could be a derivative of said particular data set, e.g. DB1 or DB2, which may have been created as a result of a cleansing or transformation operation. Instead of returning the particular data set in its original, non-parsed/non-standardized flat file format 108, the derivative data set or some of its data records are returned as search result. A user might also have privileges to manually update annotations and to add or delete annotations, whereby the search index data structure is automatically supplemented with the updates, e.g. by means of background jobs permanently synchronizing the index data structure with the annotations stored in an annotations database 114. The search functionality may be provided with the help of an application server 118 providing a search service 103 on the search index data structure 191. The user 171 may manually edit the annotations 115 of the data sets of the Big Data repository 104 via a data access service 120.

The annotations may be stored in the annotations database 114 in association with an identifier 116 of their respective data set. The annotations database 114 could reside either in the Big Data Repository or outside of it. The data set annotations could further comprise policies and rules which may specify under which circumstances data has to be masked, corrected, quality-checked, pruned, and the like. The repository monitor 102 monitors any change to the annotations 115 in the annotations database and any change in the number and type of files contained in the Big Data repository 104. The repository monitor throws an event in case any change was detected. Said event may cause all agents, or at least some agents having been registered as a listener to said kind of event, to evaluate their respectively assigned conditions and to automatically triggering the processing of their respectively assigned data set(s) in case all their conditions are fulfilled.

For instance, the repository monitor may detect that a new data set in the form of the following flat file (clients.txt) has been imported into the Big Data repository 104. The data set may have no annotation yet. The repository monitor only knows its location and the fact that it is a file named "clients.txt". Said file may comprise:
  "1576", "Cliff Langlais", "35 Livery Street, Birmingham", "28451", "single", "inactive"
  "1277", "Patrice Merkel", "Daimler Straße 3 Wiernsheim", "75444", "divorced", "employee"
  "1287", "Catherine Coon", "Schillenbergweg 10 Sundern", "59846", "married", "inactive"
  [ . . . ]

At first an agent specialized in detecting a flat file format may be executed: said agent may have assigned the condition "no annotation for attribute 'format' exists". Said agent will be automatically executed each time a new data set is detected within the Big Data repository not having assigned a value for the attribute "format" in its annotations. The agent may execute a text analytics routine that checks for the presence of lines, repeating separators, etc. The agent may detect that the new file is probably a comma separated values file (CSV file) separated with a particular delimiter. If the format is not recognized, the agent will store an annotation "format=unknown" in association with said data set in the annotations database 114 for preventing the same agent from processing said data set a second time. In addition, said annotation may prevent other agents from further processing that data set, thereby preventing the creation of erroneous derivative data sets. If the format is recognized, annotations will be created for said data set comprising the key-value pair "format='CSV'".

Another agent may search for regular expressions in a data set once the format of said data set has been identified by another agent as "raw text" or "CSV" or "XML". The regular expressions may be used for extracting, for example, a person's name, address and profession from the clients.txt file. Said agent may have assigned a condition "format='CSV or XML or plain-text'" and may be triggered automatically to process the clients.txt file as soon as the annotations of said clients.txt file comprise the property value pair "format=CSV". The output generated by said other agent for updating the annotations of the processed clients.txt data set may comprise the entity types such as 'address' and 'profession' which were identified in said file: "entity-types='person-name; address; profession'".

A third agent "A3" to process the clients.txt file may be an agent specialized in parsing structured CSV files comprising person-names and addresses by extracting said data from the file and storing the extracted data in a relational database table. The condition of said third agent may look like "format=plain-text or CSV" and "entity-types=person-name OR address" and "agent-A3=not-yet-executed". The latter condition implies that the agent "A3" hasn't run yet (there is no derivative data set in relational table form yet for the clients.txt data set). After a successful execution of agent A3, the annotations of the clients.txt data set may be updated to "agent-A3=executed". In addition, a link or an identifier of the derivative data set may be added to the annotations of the original clients.txt file, e.g. "derivative-data-set=clients-DB". Other agents may be operable to process the clients.txt file no matter whether it contains person names or other named entities. The execution of said agents may solely be triggered by the format of the file to be parsed and do the parsing job irrespective of the semantic content of the individual columns.

Fourth and sixth agents may be executed upon an event that the annotation property "derivative-data-set" has assigned a value, e.g. an identifier of the derivative relational database. The fourth and sixth agents may perform normalization steps for normalizing the addresses of the clients and/or statistical analyses or clustering algorithms for various parameters such as the zip codes. The result of the standardization task may be a new derivative structured table that will replace the previous one. For example, the previous table may have contained as single column 'address' containing all the address data while the new derivative structured table may comprise separate columns for 'street', 'house number' and 'zip code'. After having executed the standardization agent, the annotation "standardized=yes" will be added to the standardized data set to prevent the same agent from running again on this data set.

The set of agents may also comprise user-specific agents. Depending on the user's privileges, different user-specific agents may be triggered for creating a derivative data set. For example, in case a first user is allowed to inspect some confidential data while a second user is not, a first agent specific for the first user may produce a derivative data set still comprising some confidential data of the original data set while the derivative data set generated for the second user by a different user-specific agent may have become cleansed of any confidential data.

The features of embodiments of the invention may be advantageous as they may allow for a highly flexible, fully automated execution of any kind of data integration, pre-processing or processing task without any manual intervention of a user and without a provision of a predefined, static workflow by a programmer. All steps may be executed fully automatically in a data driven manner: in case a new data set or a new annotation for said data set is created and/or an existing annotation updated, the conditions of one or more agents which are operable to process said data sets may be fulfilled. Upon the fulfillment of said conditions, the execution of the respective agent having assigned said conditions may be triggered fully automatically. The execution of said agent triggers the processing of said data set. Thus, in many cases the only information a programmer of a particular agent needs to know in respect to the available data relates to the semantic and syntactic input requirements of said agent or of another program triggered by said agent to actually process said data set. The programmer does not need to know a 'global workflow' or the requirements of all the other—potentially hundreds or thousands of—agents in order to supplement a running Big Data repository with a new, fully functional agent that can pre-process data sets for other agents without even knowing that said other agents exist. This may ease the creation and maintenance of complex Big Data repositories supporting a multiple different interdependent import, pre-processing, analysis and export data processing tasks.

For example, the annotations may be updated with status information indicating that a particular pre-processing or processing step was (successfully or unsuccessfully) performed on said data set. An update of the annotations of a data set any indicate that the data set is now in the correct file format or syntax required by another agent for further processing said data set. The processing of a data set may be executed by an agent directly or by means of additional application programs (referred herein as program engines) called by said agent.

The conditions of some agents may completely or at least partly be directed at the annotations of one or more data sets. They may also be directed at the existence of files having a particular file name or file type (indicated e.g. by a particular file extension) or at the presence or absence of any annotations of said data set. For example, an agent may be triggered by a successful import of an XML file from an external data source not having been annotated yet.

That the sequence said agents are executed may solely depend on the fulfillment of data-set related conditions and thus may follow a completely data-driven, dynamically and automatically determined sequence of processing tasks. Said features may be advantageous as the time and effort of a programmer for creating and maintaining a complex Big Data repository may significantly be reduced. A programmer does not have to modify and recompile any executable source code of existing agents as none of the agents is directly called by any one of the other agents. The dynamic behavior of the agents merely depends on their respectively assigned conditions and on the dynamically updated annotations said conditions refer to. Preferentially, the conditions are editable by a user at runtime of the Big Data repository, whereby a modification of said conditions does not require a recompilation of agents or other program modules in order to become effective.

That the agents may trigger the processing of one or more of the data sets by the above described interface may allow implementing all program agents in accordance with a first program language or framework, e.g. Java, EJB, .NET or the like, while the actual processing may be done by program engines of different frameworks which may also be legacy programs. Thus, legacy data pre-processing and processing programs may be integrated easily without any recompilation or rewriting of code by means of an additional agent operable to call said legacy program as a program engine for processing a particular data set.

That an agent may selectively trigger the execution of an indicated program engine rather than any one of a plurality of other equivalent program engines may be advantageous as in cases when multiple equivalent program engines are able to execute a particular data processing task, said task may be assigned to the program engine with the lowest capacity consumption. Thus, bottlenecks may be avoided and available hardware resources may be used more effectively.

That the workload information of any one of the program engines may comprise the number of tasks currently stored in the task queue of said program engine may be advantageous as the task queues may allow a user or a system component of the Big Data repository to gather information on the load of a processing engine and to select a processing engine with free capacities for processing a particular data set.

By prioritizing one of the agents that triggers the processing of a data set that is of more relevance or importance to a user, the Big Data repository may selectively provide the information that is of high relevance to a user faster.

The prioritizing of some data sets over others may increase the flexibility, accuracy, and performance of the Big Data repository. In cases where both the priority numbers at the agents as well as of the data sets are evaluated by the agents manager, the agents may dynamically, highly flexibly and fully automatically process the data sets in dependence on the importance of the processed data and on the type of processing to be executed. No complex predefined workflow is necessary for achieving a complex and flexibly adapted behavior of the system.

For example, the agents manager may be operable to determine an agent x that is operable to trigger the processing of the data set Z, said data set having the highest priority number of all data sets to be processed by agent x. The agent manager automatically determines, e.g. by evaluating all conditions of said determined agent x, other agents which have to be executed before said agent x so that all conditions of said agent are fulfilled. This step may be repeated for all conditions of the other determined agents for identifying all agents in the dependency chain which need to be executed so that all conditions of agent x are fulfilled. The agents manager may then put all agents of the dependency chain into a global task queue, whereby the order of the tasks in said queue ensures that all agents of said dependency chain are executed in the right sequential order. This may be advantageous as a user may specify, e.g. via a GUI, that data set Z should be processed as soon as possible by agent x by assigning data set Z the highest priority number in respect to agent x. The agent manager may automatically determine all other agents in the dependency chain of agent x which need to be executed before agent x can be executed. The agents manager will then put all identified agents on the top of a global task queue, e.g. by automatically increasing a priority number assigned to said agents. Thus, the user does not have to know the dependency chain of agents which have to be executed before agent x can start.

That the Big Data repository may receive configuration data from a user and may modify the conditions of the agents, the priority number of one or more of the agents and/or the priority number assigned to one or more of the data sets according to said configuration data may be advantageous, as a user may easily adapt the behaviour of the data processing by editing configuration data without any recompilation of source code. The user is also not required to know or specify a complex data processing workflow. He may fully and solely concentrate on the configuration of a few aspects, e.g. the processing of a particular input file or on the conditions which should be met before a particular processing task/agent can start.

The automated integration of the annotations into a search index data structure may accelerate and improve the accuracy of a search as the annotations may comprise additional meta information and analysis results which may not have been contained in the data sets originally loaded into the Big Data repository.

The data sets, the Big Data repository, the agents and the program engine may be stored on a computer readable storage medium 195. Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contains, or stores a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks. The block diagrams in the Figures illustrate the architecture, functionality, and operation of possible implementations of systems, methods, and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 2 depicts a distributed variant of the computer system described in FIG. 1. At least some of the agents 162-168, 206 and corresponding program engines 134-138, 208 are hosted by another computer system 204 than the other agents and program engines running on computer system 202. The agents manager may interact with the remote agents via a network based on communication frameworks such web services, EJB, a .Net or the like. This architecture may allow integration of (remote) legacy systems. The data sets may have assigned a priority number D.1-D.5 indicating the urgency of processing said data set by a particular one of the agents 150-168, 206. In addition, each agent may have assigned a priority number P.1-P.7 which may determine which one of the agents is executed first in case two or more agents compete for a particular resource. A workload manager 176 may repetitively receive, from each of the program engines 124-136, 208, workload information indicating the capacity utilization of the respective program engine or of a computer system hosting said program engine. The workload manager provides said workload to each agent to which said program engines is assigned. This information enables an agent having assigned multiple equivalent processing engines to selectively trigger execution of the program engine having currently the lowest capacity consumption, for example, the one of a set of equivalent processing engines having the emptiest queue Q1-Q9.

Using a global task queue 196 in combination with processing engine specific queues Q1-Q9 may help improve the performance by avoiding idle time in the processing engines: instead of regularly checking the availability of a particular processing engine before letting an agent trigger the execution of said job engine, the workload manager may simply push the tasks (for executing a particular agent on a particular data set) contained in the global job queue into a suitable one of the plurality of processing engine specific queues even before the task currently executed by a program engine is actually done. Thus, the program engine can start the next task without delay.

Figure 3:
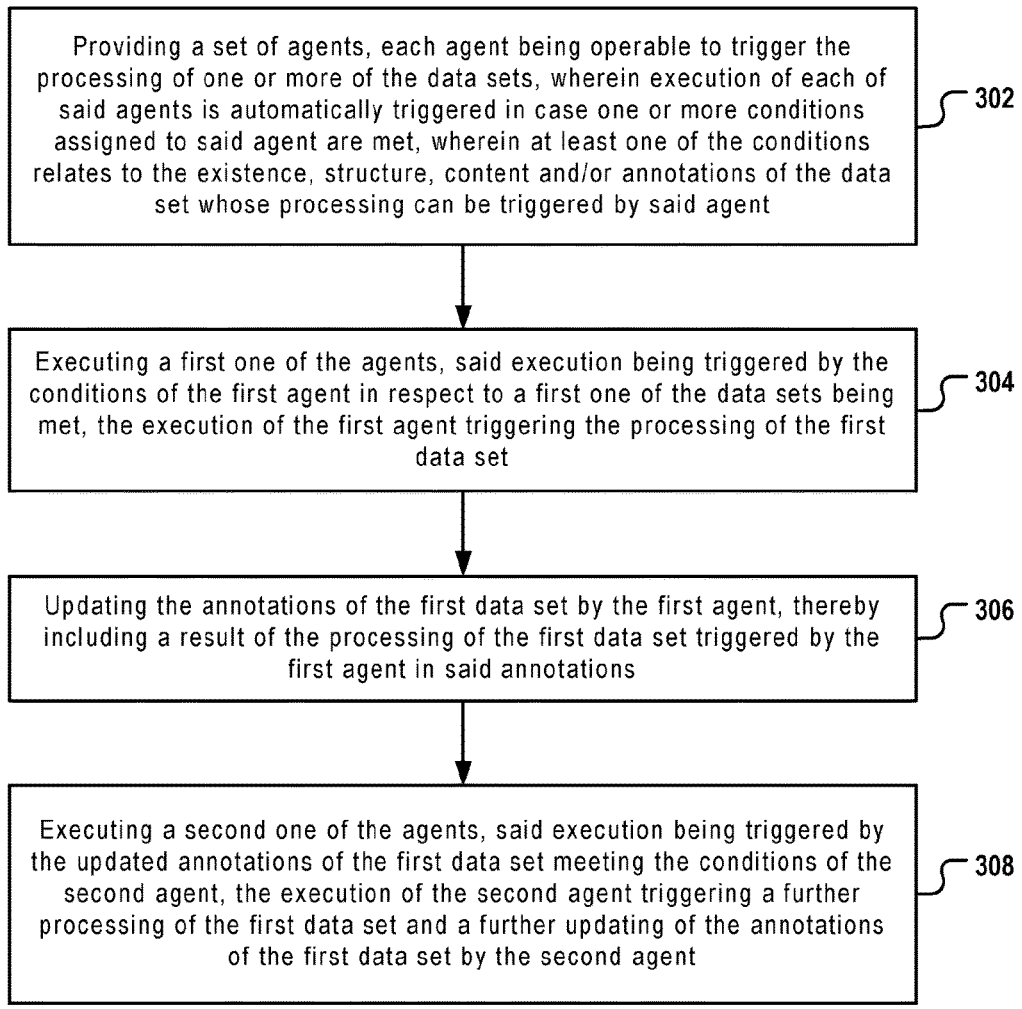
FIG. 3 is a flowchart of a method for processing multiple data sets.

FIG. 3 depicts a flow chart of a method for processing data sets of a Big Data repository 104 as described already above. In a first step 302, a set of agents 150-168 is provided. Each agent is operable to trigger the processing of one or more of the data sets 105, 106, 110-113, 108, DB1, DB2. The execution of each of said agents is automatically triggered in case one or more conditions assigned to said agent are met. In step 304, a first one of the agents may be executed. The execution of the first agent triggers the processing of the first data set, e.g. a flat file having been imported into the Big Data repository 104. After having processed the first data set by the first agent, the first agent updates the annotations of the first data set in step 306, thereby including a result of said processing in said annotations. In step 308, the execution of a second agent is triggered by the event that the updated annotations of the first data set meet the conditions of the second agent. Execution of the second agent results in a further processing of the first data set and in a further updating of the annotations of the first data set by the second agent.

The invention claimed is:

1. A computer-implemented method for processing data sets in a data repository for storing at least unstructured data, the method comprising:
   providing agents, wherein each of the agents triggers processing of one or more of the data sets, wherein execution of each of the agents is triggered in response to one or more conditions assigned to that agent being met for a data set whose processing is triggered by the agent;
   in response to executing a first agent of the agents to trigger processing of a first data set of the one or more of the data sets, wherein the execution is triggered by the one or more conditions of the first agent being met for the first data set,
      updating, by the first agent, annotations of the first data set, thereby including a result of the processing of the first data set triggered by the first agent in the annotations; and
      executing a second agent of the agents, wherein the execution is triggered by the updated annotations of the first data set meeting the one or more conditions of the second agent, wherein the execution of the second agent triggers a further processing of the first data set and a further updating of the annotations of the first data set by the second agent; and
   in response to generation, by the first agent, of a second data set that is a derivative of the first data set,
      updating, by the first agent, the annotations of the first data set to add a link that points to a storage location of the second data set; and
      processing, by the second agent, the second data set.

2. The computer-implemented method of claim 1, wherein each of the agents is triggered by one of 1) updating of the annotations of one of the data sets to be processed by that agent and 2) detection of a new data set in the data repository, wherein an execution of that agent results in the annotations of a processed data set being updated.

3. The computer-implemented method of claim 1, wherein the data repository is accessible by program engines, wherein each of the agents is assigned one of the program engines and comprises an interface to the assigned program engine, and wherein each of the agents triggers the processing of one or more of the data sets by initializing the execution of the assigned program engine via the comprised interface.

4. The computer-implemented method of claim 3, further comprising:
   providing a job queue for each of the program engines, wherein each of the program engines is executed in response to a job being added to the job queue for that program engine, and wherein the data sets to be processed by the program engines are processed in accordance with an order of jobs in each of the job queues.

5. The computer-implemented method of claim 4, wherein the data repository is coupled to a workload manager, wherein at least some of the agents trigger execution of a set of equivalent program engines, further comprising:
   receiving, by the workload manager, from each of the program engines, workload information that indicates at least one of 1) capacity utilization of that program engine and 2) capacity utilization of a computer system hosting that program engine;
   determining, by the workload manager, a program engine with a lowest capacity consumption for at least one set of equivalent program engines using the workload information; and
   providing, by the workload manager, an indication of the determined program engine to an agent to which the set of equivalent program engines is assigned, wherein the agent triggers execution of the determined program engine.

6. The computer-implemented method of claim 5, wherein the workload information for each of the program engines comprises a number of jobs currently stored in the job queue of that program engine.

7. The computer-implemented method of claim 1, wherein the data repository is coupled to an agents manager, wherein each of the agents is assigned a priority number, and further comprising:
   monitoring, by the agents manager, execution of the agents;
   determining, by the agents manager, based on information obtained from the monitoring, one of 1) that at least two of the agents are trying to process a same one of the data sets and 2) that the at least two of the agents require a computational resource that cannot be provided to each of the at least two of the agents concurrently; and
   allowing, by the agents manager, an agent of the at least two of the agents having a higher priority number to execute.

8. The computer-implemented method of claim 1, wherein the data repository is coupled to an agents manager, wherein each of the data sets is assigned a priority number, and further comprising:
   monitoring, by the agents manager, the execution of the agents;
   determining, by the agents manager, based on information obtained from the monitoring, that a third agent of the agents was initiated for triggering processing of two or more different ones of the data sets; and
   allowing, by the agents manager, the third agent to trigger processing of the data set having a higher priority number.

9. The computer-implemented method of claim 1, further comprising:
   providing a graphical user interface;
   receiving, via the graphical user interface, configuration data from a user of the data repository; and
   modifying at least one of 1) the conditions of the first agent in accordance with the configuration data, 2) a priority number of the first agent, and 3) a priority number assigned to one or more of the data sets.

10. The computer-implemented method of claim 1, further comprising:
    providing a search index data structure;
    adding annotations created by any one of the agents for any one of the data sets to the search index data structure; and
    replacing, by one of the agents, a first pointer to the first data set of the search index data structure with a second pointer to the second data set.

11. The computer-implemented method of claim 1, wherein at least one of the conditions relates to one of existence, structure, content, and annotations of the data set whose processing is triggered by the agent.

12. A computer-readable storage medium for processing data sets in a data repository for storing at least unstructured data, wherein the computer-readable storage medium comprises machine executable instructions for execution by a processor, wherein the execution of the machine executable instructions causes the processor to perform:

provide agents, wherein each of the agents triggers processing of one or more of the data sets, wherein execution of each of the agents is triggered in response to one or more conditions assigned to that agent being met for a data set whose processing is triggered by the agent;

in response to executing a first agent of the agents to trigger processing of a first data set of the one or more of the data sets, wherein the execution is triggered by the one or more conditions of the first agent being met for the first data set, updating, by the first agent, annotations of the first data set, thereby including a result of the processing of the first data set triggered by the first agent in the annotations; and executing a second agent of the agents, wherein the execution is triggered by the updated annotations of the first data set meeting the one or more conditions of the second agent, wherein the execution of the second agent triggers a further processing of the first data set and a further updating of the annotations of the first data set by the second agent; and in response to generation, by the first agent, of a second data set that is a derivative of the first data set, updating, by the first agent, the annotations of the first data set to add a link that points to a storage location of the second data set; and processing, by the second agent, the second data set.

13. The computer-readable storage medium of claim 12, wherein each of the agents is triggered by one of 1) updating of the annotations of one of the data sets to be processed by that agent and 2) detection of a new data set in the data repository, wherein an execution of that agent results in the annotations of a processed data set being updated.

14. The computer-readable storage medium of claim 12, wherein the data repository is accessible by program engines, wherein each of the agents is assigned one of the program engines and comprises an interface to the assigned program engine, and wherein each of the agents triggers the processing of one or more of the data sets by initializing the execution of the assigned program engine via the comprised interface.

15. The computer-readable storage medium of claim 14, wherein the execution of the machine executable instructions causes the processor to perform:

providing a job queue for each of the program engines, wherein each of the program engines is executed in response to a job being added to the job queue for that program engine, and wherein the data sets to be processed by the program engines are processed in accordance with an order of jobs in each of the job queues.

16. The computer-readable storage medium of claim 15, wherein the data repository is coupled to a workload manager, wherein at least some of the agents trigger execution of a set of equivalent program engines, and wherein the execution of the machine executable instructions causes the processor to perform:

receiving, by the workload manager, from each of the program engines, workload information that indicates at least one of 1) capacity utilization of that program engine and 2) capacity utilization of a computer system hosting that program engine;

determining, by the workload manager, a program engine with a lowest capacity consumption for at least one set of equivalent program engines using the workload information; and providing, by the workload manager, an indication of the determined program engine to an agent to which the set of equivalent program engines is assigned, wherein the agent triggers execution of the determined program engine.

17. The computer-readable storage medium of claim 16, wherein the workload information for each of the program engines comprises a number of jobs currently stored in the job queue of that program engine.

18. The computer-readable storage medium of claim 12, wherein the data repository is coupled to an agents manager, wherein each of the agents is assigned a priority number, and wherein the execution of the machine executable instructions causes the processor to perform:

monitoring, by the agents manager, execution of the agents;

determining, by the agents manager, based on information obtained from the monitoring, one of 1) that at least two of the agents are trying to process a same one of the data sets and 2) that the at least two of the agents require a computational resource that cannot be provided to each of the at least two of the agents concurrently; and allowing, by the agents manager, an agent of the at least two of the agents having a higher priority number to execute.

19. The computer-readable storage medium of claim 12, wherein the data repository is coupled to an agents manager, wherein each of the data sets is assigned a priority number, and wherein the execution of the machine executable instructions causes the processor to perform:

monitoring, by the agents manager, the execution of the agents;

determining, by the agents manager, based on information obtained from the monitoring, that a third agent of the agents was initiated for triggering processing of two or more different ones of the data sets; and allowing, by the agents manager, the third agent to trigger processing of the data set having a higher priority number.

20. The computer-readable storage medium of claim 12, wherein the execution of the machine executable instructions causes the processor to perform:

providing a graphical user interface;

receiving, via the graphical user interface, configuration data from a user of the data repository; and modifying at least one of 1) the conditions of the first agent in accordance with the configuration data, 2) a priority number of the first agent, and 3) a priority number assigned to one or more of the data sets.

21. The computer-readable storage medium of claim 12, wherein the execution of the machine executable instructions causes the processor to perform:

providing a search index data structure;

adding annotations created by any one of the agents for any one of the data sets to the search index data structure; and replacing, by one of the agents, a first pointer to the first data set of the search index data structure with a second pointer to the second data set.

22. The computer-readable storage medium of claim 12, wherein at least one of the conditions relates to one of existence, structure, content, and annotations of the data set whose processing is be triggered by the agent.

23. A system for processing data sets in a data repository for storing at least unstructured data, comprising:
- a processor;
- a computer-readable storage medium comprising a data repository for storing at least unstructured data, the data repository comprising data sets, the computer-readable storage medium further comprising machine executable instructions for execution by the processor, wherein the execution of the machine executable instructions causes the processor to perform:
    - providing agents, wherein each of the agents triggers processing of one or more of the data sets, wherein execution of each of the agents is triggered in response to one or more conditions assigned to that agent being met for a data set whose processing is triggered by the agent;
    - in response to executing a first agent of the agents to trigger processing of a first data set of the one or more of the data sets, wherein the execution is triggered by the one or more conditions of the first agent being met for the first data set,
        - updating, by the first agent, annotations of the first data set, thereby including a result of the processing of the first data set triggered by the first agent in the annotations; and
        - executing a second agent of the agents, wherein the execution is triggered by the updated annotations of the first data set meeting the one or more conditions of the second agent, wherein the execution of the second agent triggers a further processing of the first data set and a further updating of the annotations of the first data set by the second agent; and
    - in response to generation, by the first agent, of a second data set that is a derivative of the first data set,
        - updating, by the first agent, the annotations of the first data set to add a link that points to a storage location of the second data set; and
        - processing, by the second agent, the second data set.

24. The system of claim 23, wherein each of the agents is triggered by one of 1) updating of the annotations of one of the data sets to be processed by that agent and 2) detection of a new data set in the data repository, wherein an execution of that agent results in the annotations of a processed data set being updated.

25. The system of claim 23, wherein the data repository is accessible by program engines, wherein each of the agents is assigned one of the program engines and comprises an interface to the assigned program engine, and wherein each of the agents triggers the processing of one or more of the data sets by initializing the execution of the assigned program engine via the comprised interface.

26. The system of claim 25, wherein the execution of the machine executable instructions causes the processor to perform:
- providing a job queue for each of the program engines, wherein each of the program engines is executed in response to a job being added to the job queue for that program engine, and wherein the data sets to be processed by the program engines are processed in accordance with an order of jobs in each of the job queues.

27. The system of claim 26, wherein the data repository is coupled to a workload manager, wherein at least some of the agents trigger execution of a set of equivalent program engines, and wherein the execution of the machine executable instructions causes the processor to perform:
- receiving, by the workload manager, from each of the program engines, workload information that indicates at least one of 1) capacity utilization of that program engine and 2) capacity utilization of a computer system hosting that program engine;
- determining, by the workload manager, a program engine with a lowest capacity consumption for at least one set of equivalent program engines using the workload information; and
- providing, by the workload manager, an indication of the determined program engine to an agent to which the set of equivalent program engines is assigned, wherein the agent triggers execution of the determined program engine.

28. The system of claim 27, wherein the workload information for each of the program engines comprises a number of jobs currently stored in the job queue of that program engine.

29. The system of claim 23, wherein the data repository is coupled to an agents manager, wherein each of the agents is assigned a priority number, and wherein the execution of the machine executable instructions causes the processor to perform:
- monitoring, by the agents manager, execution of the agents;
- determining, by the agents manager, based on information obtained from the monitoring, one of 1) that at least two of the agents are trying to process a same one of the data sets and 2) that the at least two of the agents require a computational resource that cannot be provided to each of the at least two of the agents concurrently; and
- allowing, by the agents manager, an agent of the at least two of the agents having a higher priority number to execute.

30. The system of claim 23, wherein the data repository is coupled to an agents manager, wherein each of the data sets is assigned a priority number, and wherein the execution of the machine executable instructions causes the processor to perform:
- monitoring, by the agents manager, the execution of the agents;
- determining, by the agents manager, based on information obtained from the monitoring, that a third agent of the agents was initiated for triggering processing of two or more different ones of the data sets; and
- allowing, by the agents manager, the third agent to trigger processing of the data set having a higher priority number.

31. The system of claim 23, further comprising:
- providing a graphical user interface;
- receiving, via the graphical user interface, configuration data from a user of the data repository; and
- modifying at least one of 1) the conditions of the first agent in accordance with the configuration data, 2) a priority number of the first agent, and 3) a priority number assigned to one or more of the data sets.

32. The system of claim 23, wherein the execution of the machine executable instructions causes the processor to perform:
- providing a search index data structure;
- adding annotations created by any one of the agents for any one of the data sets to the search index data structure; and replacing, by one of the agents, a first pointer to the first data set of the search index data structure with a second pointer to the second data set.

33. The system of claim 23, wherein at least one of the conditions relates to one of existence, structure, content, and annotations of the data set whose processing is be triggered by the agent.

* * * * *